US012651241B2

(12) United States Patent
Abrams et al.

(10) Patent No.: US 12,651,241 B2
(45) Date of Patent: *Jun. 9, 2026

(54) POINT OF SALE DEVICE WITH SECURE CONNECTION BETWEEN SECURITY MESHES

(71) Applicant: Fiserv, Inc., Milwaukee, WI (US)

(72) Inventors: Jacob Whitaker Abrams, San Mateo, CA (US); Seihee Chon, Fremont, CA (US); Vincent Durieux, Campbell, CA (US); Eric David Fuhs, Sunnyvale, CA (US); Brian Jeremiah Murray, Mountain View, CA (US); Victor Pan, Fremont, CA (US); Sam Niansheng Qiu, Palo Alto, CA (US); Bambi Tsui, San Francisco, CA (US); Siva Raja Sekhar Reddy Yeruva, Menlo Park, CA (US)

(73) Assignee: Fiserv, Inc., Brookfield, WI (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/767,436

(22) Filed: Jul. 9, 2024

(65) Prior Publication Data

US 2024/0362604 A1      Oct. 31, 2024

Related U.S. Application Data

(63) Continuation of application No. 16/811,760, filed on Mar. 6, 2020, now Pat. No. 12,067,546.

(51) Int. Cl.
| | |
|---|---|
| *G06Q 20/20* | (2012.01) |
| *H04L 9/08* | (2006.01) |
| *H04L 9/32* | (2006.01) |

(52) U.S. Cl.
CPC ......... *G06Q 20/202* (2013.01); *H04L 9/0841* (2013.01); *H04L 9/3247* (2013.01); *H04L 9/3263* (2013.01)

(58) Field of Classification Search
CPC ............. G06Q 20/202; G06Q 20/3829; G06Q 20/40975; H04L 9/0481; H04L 9/3247;
(Continued)

(56) References Cited

U.S. PATENT DOCUMENTS

| | | |
|---|---|---|
| 10,326,797 B1 | 6/2019 | Murray et al. |
| 2014/0241523 A1 | 8/2014 | Kobres et al. |

(Continued)

FOREIGN PATENT DOCUMENTS

| | | |
|---|---|---|
| CN | 107274185 | 10/2017 |
| CN | 110832518 | 2/2020 |
| TW | 201723946 | 2/2018 |

OTHER PUBLICATIONS

Wang, Xiaosheng et al. A Secure Dual-Core Processor Design for Embedded Terminal Device. 2018 IEEE 3rd Advanced Information Technology, Electronic and Automation Control Conference (IAEAC), 2018. (Year: 2018).*

(Continued)

*Primary Examiner* — Fawaad Haider
(74) *Attorney, Agent, or Firm* — Foley & Lardner LLP

(57) ABSTRACT

Systems and methods involving secure connections between security meshes are disclosed herein. One disclosed device includes a first security processor located within a first security mesh, a first casing having a connector and supporting the first security mesh and the applications processor, a second security processor located within a second security mesh, and a second casing connected to the first casing via the connector and supporting the second security mesh. The first security processor and second security mesh. The first security processor and second security (Continued)

<u>100</u> processor are programmed to generate a unique pre-shared key independently on both the first security processor and the second security processor using an elliptic key exchange and establish a secure connection between the first security processor and the second security processor using the unique pre-shared key.

20 Claims, 6 Drawing Sheets

(58) Field of Classification Search
CPC ..... H04L 9/3263; H04L 9/0844; H04L 9/321; H04L 9/3265; H04L 2209/56; G06F 21/606; G06F 21/71; G06F 21/74; G06F 21/85; G06F 21/86; G07F 7/0873; G07G 1/0009; G07G 1/0018
USPC .......................................................... 705/21
See application file for complete search history.

(56) References Cited

U.S. PATENT DOCUMENTS

| | | | | |
|---|---|---|---|---|
| 2015/0324781 | A1 | 11/2015 | Saitoh | |
| 2015/0324793 | A1 | 11/2015 | Guise et al. | |
| 2016/0117659 | A1 | 4/2016 | Bedier et al. | |
| 2018/0005230 | A1 | 1/2018 | Zovi et al. | |
| 2018/0033255 | A1* | 2/2018 | Beatty | G07G 1/0009 |
| 2019/0066103 | A1 | 2/2019 | Murray | |
| 2019/0172036 | A1 | 6/2019 | Bedier et al. | |
| 2019/0207953 | A1 | 7/2019 | Klawe et al. | |
| 2019/0295060 | A1* | 9/2019 | Patwardhan | G06Q 20/202 |
| 2019/0325437 | A1* | 10/2019 | Murray | G06Q 20/3829 |

OTHER PUBLICATIONS

Office Action issued in connection with Taiwan Appl. No. 109146262 dated Oct. 28, 2024.

Credential Management for Internet of Things Devices, Technical Disclosure, published Dec. 2017, Internet Protocol for Smart Objects (IPSO) Alliance, available at hllps://www.omaspecworks.org/wp-content/uploads/2018/03/PSO-IoT-Credential-Management_Final.pdf, (Accessed on: Dec. 2, 2019), 17 pages.

ECC Certificate Signing Request (CSR) Generation Instructions for Apache SSL, Technical Disclosure, published Apr. 19, 2019, DigiCert., available at hllps://knowledge.digicert.com/generalinformation/INFO1909.html, (Accessed on: Dec. 2, 2019), 7 pages.

ECDSA: The digital signature algorithm of a better internet, Technical Disclosure, published Mar. 10, 2014, Nick Sullivan, Cloudflare, available at hllps://blog.cloudflare.com/ecdsa-the-digital-signature-algorithm--0f-a-betler-internel/, Accessed on: Dec. 2, 2019), 14 pages.

Extended European Search Report issued in connection with EP Appl. No. 21765072.0 dated Dec. 14, 2023.

Final Office Action on U.S. Appl. No. 16/811,760 dtd Jan. 29, 2024.

Final Office Action on U.S. Appl. No. 16/811,760 dtd Jul. 26, 2023.

Final Office Action on U.S. Appl. No. 16/811,760 dtd Aug. 10, 2022.

Foreign Action other than Search Report on PCT dtd Sep. 15, 2022.

Foreign Search Report on PCT PCT/US2021/018209 dtd Apr. 28, 2021.

International Search Report and Written Opinion dated Apr. 28, 2021 from International Application No. PCT/US2021/018209m, 17 pages.

Jiang et al., "A Blockchain-Based Authentication Protocol for WLAN Mesh Security Access", CMC, 2019, vol. 58, No. 1, pp. 45-59.

Kisialiova, Liudmila. Payment Terminal Emulator. Universidade do Porto (Portugal) ProQuest Dissertations Publishing, 2020. (Year: 2020).

Non-Final Office Action on U.S. Appl. No. 16/811,760 dtd Mar. 20, 2023.

Non-Final Office Action on U.S. Appl. No. 16/811,760 dtd Oct. 23, 2023.

Notice of Allowance on U.S. Appl. No. 16/811,760 dtd Apr. 10, 2024.

NXP Introduces New Innovative "Plug and Trust" Approach to IoT Security Using NXP A71CH Trust Anchor, Technical Disclosure and Publicly Available Product, published Feb. 27, 2018, NXP, available at https://www.globenewswire::om/news-release/2018/02/27/1395853/0/en/NXP-Introduces-New-Innovative-Plug-and-T rust-Approach-to-Io TSecurity-Using-NXP-A71 CH-Trust-Anchor.html, (Accessed on: Dec. 2, 2019), 5 pages.

Tonesi et al., "Smart PSK Provisioning: a Key-Management and Authentication Scheme for Wireless LANs", IEEE, J005, pp. 119-124.

US Office Action on U.S. Appl. No. 16/811,760 dtd Dec. 7, 2021.

* cited by examiner

100

101

102

103

104

101

105

200

300

POINT OF SALE DEVICE WITH SECURE CONNECTION BETWEEN SECURITY MESHES

CROSS-REFERENCE TO RELATED APPLICATIONS

This application is a continuation of U.S. application Ser. No. 16/811,760, filed Mar. 6, 2020, which application is herein incorporated by reference in its entirety.

BACKGROUND

POS devices constitute a strategic target for unscrupulous parties aiming to obtain sensitive financial information from users or businesses. Ensuring secure transactions and data privacy is a major concern for the electronic payments industry. Payment information needs to be managed via a secure channel that is protected from unscrupulous third parties that may attack the system in several ways, such as by eavesdropping on the channel or spoofing the POS. Unscrupulous parties can also obtain sensitive information, such as credit card numbers or private payment PINs, by physically attacking the device and tampering with the hardware. In these kinds of attacks, the attacker may penetrate the device to access and manipulate secure elements of the system. Tamper proofing techniques is therefore an essential component for reinforcing the security of POS devices.

Security meshes, or tamper meshes as they are also known, provide a highly efficient anti-tamper mechanism. Security meshes surround the components of a device or system in order to keep them protected from external attacks. They create a physical barrier against intrusions and can be coupled to the internal hardware as to provide indications when unexpected activity occurs. Security meshes can, for example, detect when a tamper has occurred or when there is a potential attack by using different kinds of sensors. The device could be operatively connected to the security mesh and be configured to take a certain action if unauthorized activity is detected, such as providing a physical indication of tampering, sounding an alarm, disabling the device, erasing all sensitive data stored on the device or clearing critical parts of the device's memory.

SUMMARY

This disclosure relates to point of sale (POS) devices with secure connections between one or more security meshes. The POS devices can have at least two security meshes which each house a security processor. The security processor can be an integrated circuit having processing components and a secure memory. The secure memory can include nonvolatile memory such as flash or EEPROM and volatile memory such as SRAM. The security mesh nodes can be monitored for tampering using a dedicated tamper detection circuit on the security processor. In the event of a tamper detection, the secure memory of the security processor can be cleared. The security mesh nodes can also each house the front end for a means for receiving payment information.

This disclosure references devices that include means for receiving payment information. Payment information includes account numbers, personal identification numbers (PINs), biometric information, passwords, or any other information that is used by a payment processor to authorize the transfer of funds from one entity to another. Common examples of payment information include 16-digit credit card numbers for credit card transactions and 4-digit PINs for debit card transactions. Means for receiving payment information include key pads for receiving PINs such as mechanical keypads and touch displays with software controlled keypads, bar code scanners (including QR code scanners), magnetic stripe readers (MSRs) for reading magnetically encoded account numbers, near field communication (NFC) readers for contactless payment processing, finger print readers, infrared surface or gesture analyzers, chip card readers, microphones for receiving auditory information, and other methods known in the industry.

In specific embodiments of the invention in which the various security meshes of the POS devices include front ends for different means for receiving payment information, the secure connection can assure that payment information recently obtained on, or otherwise stored within, a first security mesh can be securely transferred to a second security mesh on a POS device. For example, a first security mesh housing the front end for a chip card reader and a second security mesh housing the front end for a mechanical key pad can share the payment information they obtain using the secure connection in order to generate a combined PIN and payment card number in order to encrypt the combined information with a payment key for transfer to an external source of approval for the payment.

In specific embodiments of the invention, a POS device can include two or more connected casings. In these embodiments, the POS device can also have two or more security meshes, wherein each casing includes one of the security meshes. The two casings can be connected by a connector to form the POS device. In this manner different components of a POS device can be interchanged to increase the means for receiving payment information that can be offered by a line of POS devices. For example, a POS device can include a first security mesh with a set of front ends for receiving payment information such as a touch screen, a magnetic stripe reader, a chip card reader, and an NFC card reader. However, the device might not include a mechanical keypad, which some users prefer for entry of pins as compared to a standard touch screen. If the POS device includes a first casing attached to a detachable stand via a connector, the detachable stand can be removed and replaced with a second casing housing a security processor and the front end for a mechanical keypad. In this way, the same base component can be used in a configuration in which a mechanical keypad is not required, and in a configuration in which a mechanical keypad is desired.

In specific embodiments of the invention, a POS device having two or more security meshes can form a secure connection between the two or more security meshes in various ways. The security meshes can each house a security processor used to administrate the formation of the secure connection. The POS device can be provisioned with a unique pre-shared key for each of the security meshes that can be used as the basis for forming the secure connection. The unique pre-shared key could be injected into the devices in a secure key injection room. The unique pre-shared key could be a secret key independently generated within the security meshes using a key generation algorithm such as an elliptic key exchange algorithm. The unique pre-shared key could be generated using cryptographic material from certificates provided to the devices and signed by a trusted certificate authority. The trusted certificate authority could be an external certificate authority such as a key injection machine or secure laptop in a secure key injection room. The certificates could include a certificate associated with each of the security meshes. Each security mesh could receive all of the certificates associated with each of the security meshes and verify the signature from the external certificate authority on all of the certificates as a predicate to generating the unique pre-shared key and/or establishing the secure connection. The security processors could each generate their own certificate signing requests for signing by the trusted certificate authority. The certificate signing requests could include global unique identifiers associated with each of the security processors and/or the security meshes.

In specific embodiments of the invention, one of the security meshes can include an applications processor, such as a standard core processing IC for a computer terminal or other consumer electronics device, that serves as an intermediary between the secure processors and/or between the secure processors and an external certificate authority (if present). The applications processor can include an operating system such as the Android operating system. Embodiments in accordance with these approaches exhibit certain benefits in that the applications processor can be configured to communicate via an efficient connection for the inter-mesh communications such as a universal serial bus (USB) connection while the secure processor may only need to communicate using a custom inter-processor interface. Security meshes, or any associated casings, that do not include applications processors can alternatively include protocol hubs (e.g., a USB hub) to provide any security processor in those meshes with similar functionality. Embodiments in accordance with these approaches also exhibit certain benefits in that the applications processor can translate basic certificate signing requests into formats that are more amenable to the rapid processing of such requests by an external certificate authority. For example, the security processors may be limited to processing units which are only able to provide certificate signing requests via a custom remote procedure call (RPC) while the applications processor is better equipped to translate that remote procedure call into a hypertext transfer protocol (HTTP) request for an external system.

In specific embodiments of the invention, a POS device is provided. The POS device comprises a first security processor located within a first security mesh. The POS device also comprises an applications processor. The POS device also comprises a first computer readable medium located within the first security mesh and accessible to the first security processor and storing instructions which, when executed by the first security processor cause the device to: transmit a first certificate signing request from the first security processor to the applications processor; receive a signed first certificate from the applications processor at the first security processor; receive a signed second certificate from the applications processor at the first security processor; verify the signed first certificate and the signed second certificate at the first security processor; generate, subsequent to verifying the signed first certificate and the signed second certificate, a unique pre-shared key using information from the signed first certificate and the signed second certificate; and establish a secure connection with a second security processor using the unique pre-shared key.

In specific embodiments of the invention, a POS device is provided. The POS device comprises a first security processor located within a first security mesh, a second security processor located within a second security mesh, a first computer readable medium located within the first security mesh and accessible to the first security processor. The first computer readable medium stores instructions which, when executed by the first security processor, cause the device to: generate a first certificate signing request which includes a first global unique identifier associated with the first security mesh, receive a signed first certificate from an external certificate authority in response to the first certificate signing request, and receive a signed second certificate from the external certificate authority. The POS device also comprises a second computer readable medium located within the second security mesh and accessible to the second security processor. The second computer readable medium stores instructions which, when executed by the second security processor, cause the device to: generate a second certificate signing request which includes a second global unique identifier associated with the second security mesh, receive a signed second certificate from the external certificate authority in response to the second certificate signing request, and receive the signed first certificate from the external certificate authority. The instructions stored on the first and second computer readable medium further, when executed by the first and second security processors respectively, cause the device to verify, on both the first and second security processors, the signed first certificate and the second signed certificate, generate, subsequent to verifying the signed first certificate and the signed second certificate and on both the first and second security processors, a unique pre-shared key using information from the signed first certificate and the signed second certificate, and establish a secure connection between the first security processor and the second security processor using the unique pre-shared key.

In specific embodiments of the invention, a POS device is provided. The POS device comprises a first security processor located within a first security mesh, a first casing having a connector and supporting the first security mesh, a second security processor located within a second security mesh, and a second casing connected to the first casing via the connector and supporting the second security mesh. The POS device further comprises a first computer readable medium located within the first security mesh and accessible to the first security processor and a second computer readable medium located within the second security mesh and accessible to the second security processor. The computer readable media can be the secure memories of the processors or external memories that are also located within the security meshes. Instructions are stored by the first and second computer readable mediums which, when executed by the first security processor and the second security processor cause the device to: generate a unique pre-shared key independently on both the first security processor and the second security processor using an elliptic key exchange and establish a secure connection between the first security processor and the second security processor using the unique pre-shared key. The resulting device can then share secure information between the two security meshes. Different components with different means for receiving payment information and their own secure meshes can then be swapped and connected in various combinations to increase the versatility of a line of POS devices.

DETAILED DESCRIPTION

Methods and systems related to POS devices with secure connections between security meshes in accordance with the summary above are disclosed in detail herein. The methods and systems disclosed in this section are nonlimiting embodiments of the invention, are provided for explanatory purposes only, and should not be used to constrict the full scope of the invention.

Figure 1:
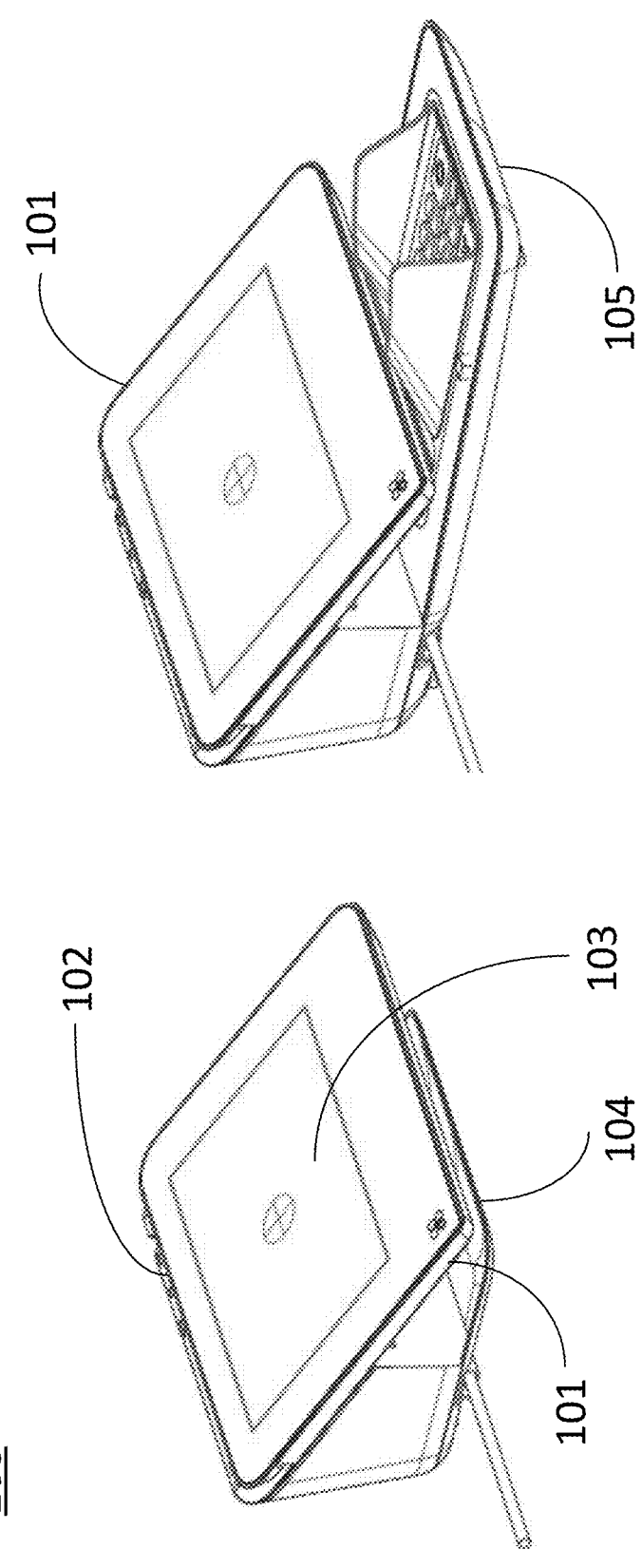
FIG. 1 illustrates a POS device with multiple casings in accordance with specific embodiments of the invention disclosed herein.

FIG. 1 illustrates a separable POS device 100 in accordance with specific embodiments of the present invention in two different configurations. The POS device 100 can comprise a single casing 101 or a combination of casings for housing different components of the POS device. As illustrated, POS device 100 can include a single casing 101 with a built-in magnetic stripe and chip card reader 102 for accepting payment card information from a user along with a touch screen 103 for accepting PIN information from a user. In this configuration the casing 101 is connected to a detachable base 104. In a separate configuration, the POS device 100 can still include first casing 101 but can also include an additional casing which houses a mechanical keypad 105 to provide an alternative channel for receiving PIN information from a user.

In specific embodiments of the invention in which a POS device includes multiple casings, different casings housing different components of the POS device can be coupled by an operative connection. Each casing could have a connector configured to connect or join one or more casings to alternative components or other casings. For example, a POS device could include an interchangeable base that can be coupled or fixed to the connector. As in FIG. 1, the interchangeable base could be a simple base, or a second casing of the POS device could be embodied as an interchangeable base. In embodiments in which the POS device could include multiple casings the connector could include a wire than can be used to establish a connection with the one or more casings.

In specific embodiments of the invention, the different components of a POS device could include different security meshes. For example, casing 101 and the casing supporting mechanical keypad 105 could each include security meshes. A POS device in accordance with these approaches can provide a secure environment for splitting the components of a POS device into one or more casings by providing multiple security meshes and a secure connection between them. This is advantageous in that it provides flexibility to the system while reinforcing security. Casings can be swapped to create different combinations of components for the POS device while keeping components and information secure and allowing the establishments of an expandable zone of trust between the security meshes.

Security meshes become prone to premature failure as their size and complexity increase. Accordingly, by providing multiple security meshes that are securely interconnected instead of a larger security mesh surrounding all the components of the device, the security of the system can be enhanced. Providing multiple security meshes that are securely interconnected also provides flexibility to the system in that components can be separated into different casings while still being protected and interconnected.

Flexibility is also achieved in the design of the POS device. With the possibility of securely separating components into one or more casings the resulting POS device can be adapted to take several different forms and shapes. POS devices with this characteristic allow manufacturers to provide merchants with a greater variety of potential POS devices as individual merchants can mix and match to decide, for example, which means for receiving payment information they will offer their customers.

The features described above allow multiple combinations of functionalities for a POS device. For example, a POS device 100 could operate with a secure processor and a touch screen housed by casing 101 where a user inserts payment information, such as a credit card number. POS device 100 can then easily and securely be adapted to operate with an additional card reader or PIN pad module by connecting a different casing to casing 101 and creating a secure connection between the two, adding new functionalities to the device without jeopardizing the security of the transaction.

Figure 2:
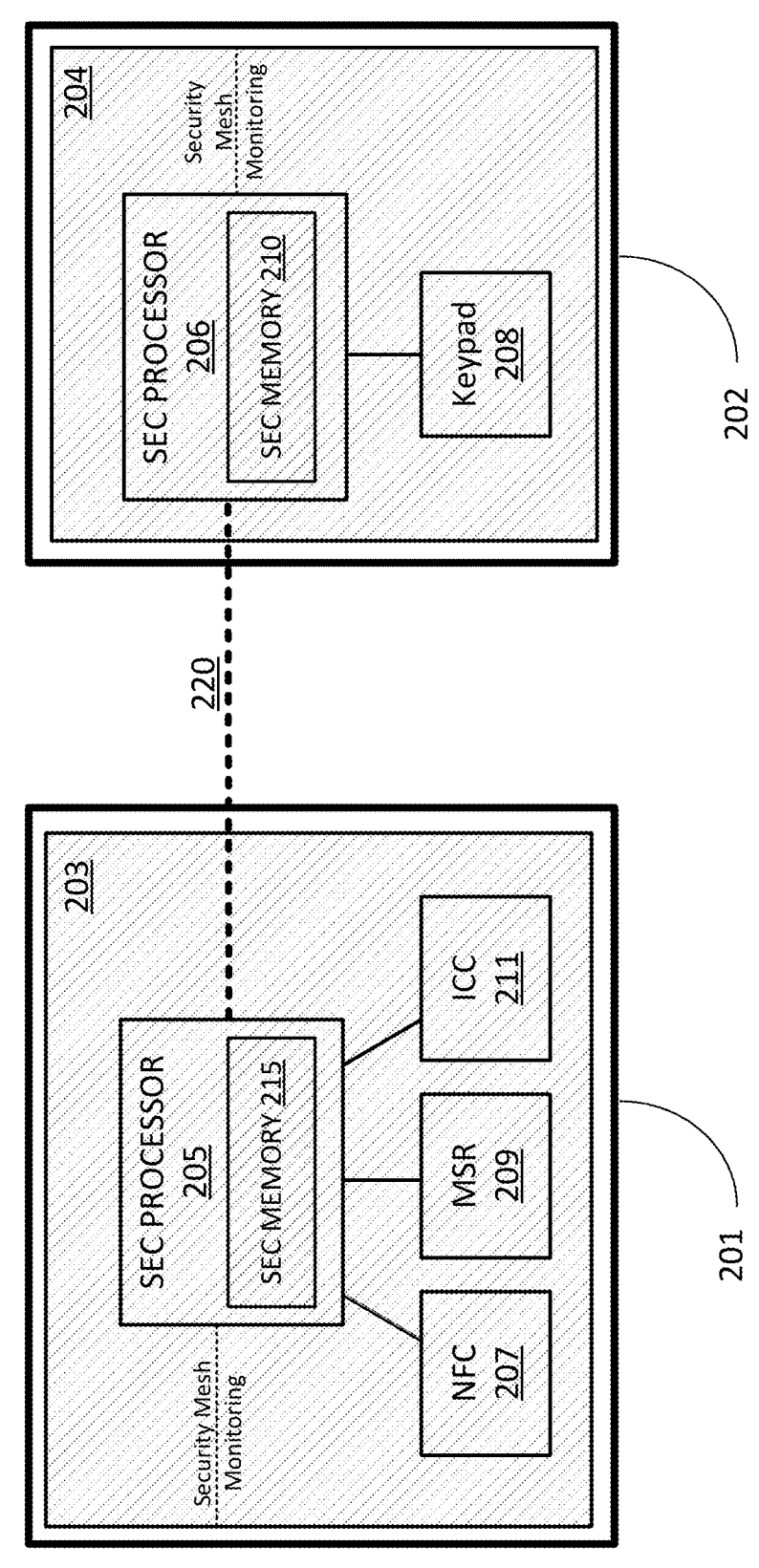
FIG. 2 illustrates the architecture of a POS device with multiple casings in accordance with specific embodiments of the invention disclosed herein.

FIG. 2 illustrates a POS device 200 in accordance with specific embodiments of the present invention. In specific embodiments, the POS device 200 can include a first casing 201 comprising a first security processor 205 and the front ends of one or more means for receiving payment information. The POS device 200 could also include a second casing 202 comprising a second security processor 206 and the front ends of one or more means for receiving payment information. In the example of FIG. 2, the front ends include a Near Field Communications (NFC) interface 207, a Magnetic Stripe Reader (MSR) interface 209 and an Integrated Chip Card (ICC) reader interface 211 in the first casing 201 and a mechanical keypad front end 208 in the second casing 202. The mechanical keypad could be, for example, a PIN pad. The security processors 205 and 206 can include secure memories 210 and 215. These secure memories can store cryptographic material such as payment and pairing keys as well as serving as computer readable media storing instructions which, when executed by the processors cause the device to carry out certain actions. The secure memory can include nonvolatile memory such as flash or EEPROM and volatile memory such as SRAM. The instructions can also be stored on external memory accessible to the secure processors.

In specific embodiments, the first casing 201 and the second casing 202 can work as independent devices that can be coupled to work together as part of a system.

As mentioned, in specific embodiments of the invention, the individual casings will each include their own secure meshes and security processors. As illustrated, a first security processor 205 can be located within and associated to a first security mesh 203 and a second security processor 206 can be located within and associated to a second security mesh 204. Security processors 205 and 206 could obtain information related to the status of the corresponding security meshes 203 or 204 and perform secure operations while monitoring the security meshes. Security meshes 203 and 204 can be monitored for tampering using a dedicated tamper detection circuit on the corresponding security processor 205 or 206, for example. Security processors 205 and 206 can perform secure operations within the security mesh boundaries they belong to and also provide the possibility of secure operations across the security meshes boundaries. For example, security processors 205 and 206 can be configured to encrypt payment information received by the front ends located within the same casings for transmission to a payment processor or transmit encrypted payment information to an alternative casing for further transmission to a payment processor.

In the example of FIG. 2, the first security processor 205 and front ends 207, 209 and 211 located within the first casing 201 can be protected by the first security mesh 203 and the second security processor 206 and front end 208 located within the second casing 202 can be protected by the second security mesh 204. The casings 201 and 202 can support the corresponding security meshes 203 and 204 and all components within the security meshes. The casings can include adhesives, snaps, screws, and other means of supporting the security meshes and the included components. The casings can also be configured to form an additional physical barrier around the security meshes when the POS device to which they form a part is fully assembled.

In specific embodiments of the invention, multiple casings can be connected together using a connector. The connector can be a latch and socket assembly, a threaded screw connection, a frame for supporting an adhesive or screw-fastened bond, or any other method for connecting casings known in the consumer electronics industry. For example, casings 201 and 202 could have a connector for connecting to each other (or to one or more other casings). In embodiments in which a secure connection is going to be formed between the casings, the connector could include a wire that can be used to establish such a secure connection. For example, a connector between casings 201 and 202 could include a shielded wire for facilitating secure connection 220 between the components located in the different security meshes.

Secure connections between various security meshes can be used for different purposes and formed in different ways. For example, a secure connection 220 can be established between the security processors 205 and 206 located in different security meshes 203 and 204, respectively. The goal of secure connection 220 could be to provide a secure channel between the security processors 205 and 206 so that sensitive information can be securely exchanged between them. Information sent over the secure connection 220 is only visible to the endpoints and cannot be modified by attackers without detection. Confidentiality and integrity of the information is ensured when using the secure connection.

A secure connection, such as secure connection 220, can be used, for example, to share payment keys or payment key sets that are used to encrypt payment information at the POS for transmission through a network to a payment processor. The payment keys can be generated in one security mesh and distributed for use to alternative security meshes. Alternatively, each security mesh can share a common payment key set and the usage of payment keys from those payment key sets can be synchronized across the various security meshes using the secure connection. Alternatively or additionally, a secure connection, such as secure connection 220, can be used to directly send payment information received from one security processor (for example 206) to another security processor (for example 205) in encrypted form. Thus, sensitive information, such as credit card details or private PINs is protected. In the embodiment described in FIG. 2, for example, information entered in the keypad 208 of the second casing 202, such as a PIN for a debit card, a CVV or CVC for a credit card, or a token for completing or authorizing a purchase, can be securely transmitted to the first casing 201 for further processing through the secure connection 220. The information can be, for example, matched with debit or credit card information read by the front ends 207, 209 or 211 housed by the first casing 201.

In specific embodiments of the invention, the secure connection can take on many forms. The secure connection may be a wired connection or a wireless connection. The secure connection may be established using an authenticated and confidential channel establishment (ACCE) protocol. The ACCE protocol could be, for example, a transport layer secure (TLS) establishment protocol. In approaches in which the connection is wired and the wire is a USB cable, where the transport protocol is USB, the secure connection may be provided by TLS over USB. TLS could also be adapted to any kind of TLS connection, such as TLS over Bluetooth or TLS over TCP/IP. The term TLS protocol is used in accordance with its standard usage in the industry and is not meant to refer specifically to the transport layer of the OSI model. The secure connection could be formed via a pre-shared key (PSK). The procedure for establishing the PSK could follow certain requirements in order to ensure the security of the connection. For example, the PSK may only exist on the security processors (e.g., 205 and 206), the data to derive the PSK may only exist within the security mesh boundaries (e.g., 203 and 204), and/or the PSK establishment may only happen in a secure room at a factory. The PSK establishment process could bind the PSK to the particular security processors used in the device. That is, data unique to the security processor could be used as input to a PSK derivation function. The data could be used as a global identifier for the security processor or the security mesh with which it is associated. The global identifier could be used by a certificate authority or other higher-level authenticator to administrate its system of authentication.

In specific embodiments of the invention, the security processors can communicate using the secure connection in various ways. For example, security processors 205 and 206 within each security mesh 203 and 204 communicate with each other using the secure connection 220. This communication could occur through a direct connection between the security processors 205 and 206. The direct connection could be a direct proprietary connection formed on the secure connection. The communication could be a standardized connection such as a USB connection. The communication could be through a hub for that standardized connection located on one or more of the security processors. For example, each security mesh could include a USB hub for this purpose. When a USB connection is established, a USB abstraction layer may be provided either by the security processors or the USB hubs. The communication could also occur through an applications processor located in one or more of the devices. Combinations of these approaches are also possible such as where one mesh includes an applications processor which forms a standardized connection with hubs for that standardized connection located on the alternative security meshes. Such approaches could be beneficially applied to scenarios where a POS device included interchangeable peripherals and a main casing as the main casing would benefit from the presence of an applications processor which may not be a necessary component of a peripheral.

Figure 3:
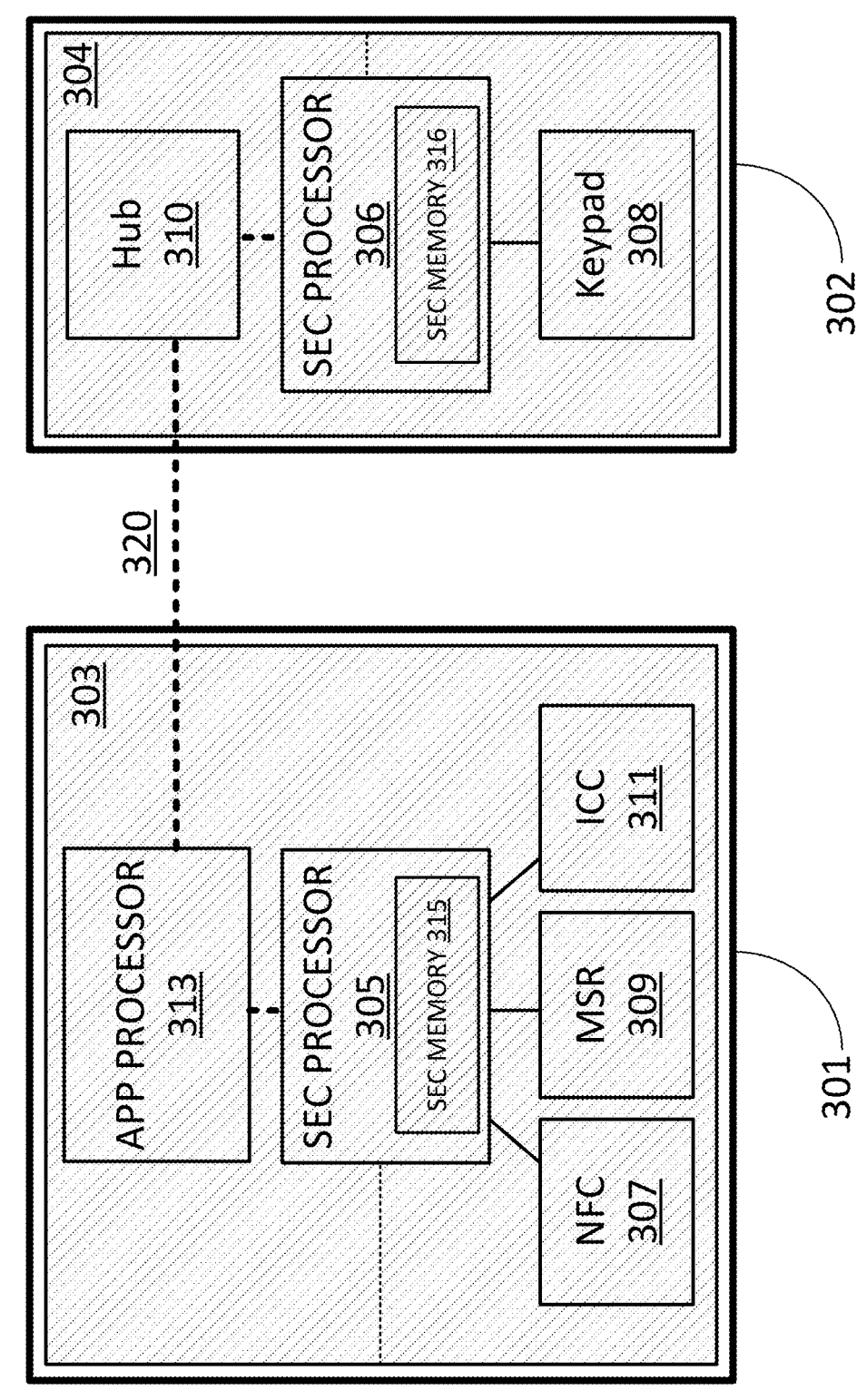
FIG. 3 illustrates the architecture of a POS device with multiple casings including an applications processor in accordance with specific embodiments of the invention disclosed herein.

FIG. 3 illustrates a configuration of a POS device 300 in accordance with specific embodiments of the present invention. In this embodiment, a first casing 301 is provided including a first security mesh 303 and housing an applications processor 313, a first security processor 305, and the front ends 307, 309, 311. A second casing 302 is provided including a second security mesh 304 and housing a USB hub 310, a second security processor 306, and the front end 308. The secure processors 305 and 306 can include secure memories 315 and 316. These secure memories can store cryptographic material such as payment and pairing keys as well as serving as computer readable media storing instructions which, when executed by the processors cause the device to carry out certain actions. The secure memory can include nonvolatile memory such as flash or EEPROM and volatile memory such as SRAM. The instructions can also be stored on external memory accessible to the secure processors.

In embodiments that are in accordance with FIG. 3, the applications processor 313 and the USB hub 310 allow for the establishment of a secure connection 320 between the security processors 305 and 306. As illustrated, applications processor 313 could be provided between the USB hub and the security processor 305. The applications processor 313 could be responsible for managing the communication between elements located in different security mesh boundaries. However, the applications processor 313 could be omitted, with the secure connection established directly between the security processors, using for example the USB hub 310 and another USB hub in security mesh 303. In specific embodiments, a USB abstraction layer may be provided on the applications processor 313 to allow a USB connection between the security processors 305 and 306 that may otherwise not be able to communicate via USB.

The applications processor 313 could act as an intermediator for communication between the security processors 305 and 306. The applications processor 313 could communicate with security processor 305 via RPCs and could communicate with security processor 306 via RPCs over USB. The applications processor 313 can be located inside or outside the security mesh 303. In the embodiment shown in FIG. 3, only one of the casings (casing 301) includes an applications processor 313. In specific embodiments, more than one casing could include an applications processor. For example, an applications processor could also be located within casing 302. In specific embodiments, all the casings forming a POS device include an applications processor. In the embodiment shown in FIG. 3, where only casing 301 includes an applications processor 313, the applications processor 313 could be responsible for instantiating the operating system of the overall POS device 300 and manage the secure connection between the security processors 305 and 306. In this embodiment, security processor 306 could be able to communicate via hub 310.

In specific embodiments of the invention, the applications processors disclosed herein may have access to a memory and/or computer readable medium, either locally on the processor or external to the processor, which stores instructions that, when executed by the applications processor cause the device to conduct certain actions. For example, applications processor 313 could include an onboard memory storing instructions to conduct various action such as how to serve as an intermediary between the security processors. The computer readable medium accessible to the applications processor can store instructions to carry out different actions, such as managing the authentication process or the message exchange between security processors, receive and manage capabilities information from an external security processor, instantiate and adjust at least one aspect of the operating system, transfer messages between security processors located in different security meshes, polling the security processors for outbound messages, and receiving, translating and managing certificate signing requests from the security processors, etc.

In the example of FIG. 3, the applications processor 313 may be configured to allow transference of messages between the security processors 305 and 306 located in different security meshes 303 and 304, using the secure connection 320. The applications processor 313 may be configured to periodically poll the security processors for outbound messages. For example, the applications processor 313 may periodically poll security processor 306 for outbound messages for security processor 305 and transfer the outbound messages from security processor 306 to security processor 305 using the secure connection 320.

In specific embodiments of the invention, an applications processor located on one device can be the master device for the POS system. For example, applications processor 313 could be configured to instantiate the operating system for the overall device, and/or to operate each security processor individually in a master-servant relationship. The responsibilities of applications processor 313 and security processor 305 could be split to allow for a secure but extensible POS device. Applications processor 313 could operate to instantiate an operating system such as Android or an equivalent. The operating system could provide and manage applications for the POS device, such as a register application. Security processor 305 could retain control of secure operations, such as key management and payment information encryption. Security processor 305 could have a higher level of security but less functionality and configurability while applications processor 313 could be a consumer grade general microprocessor. Secure memory 315 and 316 would be responsible for storing secret keys, such as payment keys or pre-shared keys for establishment of the secure connection 320. In the embodiments in which the applications processor 313 manages the communication between the security processors 305 and 306, the applications processor 313 could operate on information pre-processed (e.g., encrypted) by the security processors 305 and 306, such that sensitive information is never visible to the applications processor 313. For example, messages containing sensitive information, such as payment-related information, will still be transferred from security processor 306 to security processor 305 and the information will be visible to the endpoints (security processors 305 and 306) that have the shared key to encrypt it and decrypt it while applications processor 313 serve as an intermediary for their communication but is unable to access the content of those messages. In order to ensure security of the system, applications processors 313 may never have access to the secret keys and may never be able to decrypt the information transmitted from one security processor to the other.

In specific embodiments of the invention, an applications processor, such as applications processor 313, could be configured to detect when a new component, casing, device, or security mesh has been added to a POS device. For example, applications processors 313 could be configured to identify operational, physical or functional characteristics of the added components, and to update, adjust or reconfigure the POS accordingly. Applications processor 313 could be configured, for example, to receive capabilities information from an added security processor and to adjust the operating system and/or POS device accordingly. For example, applications processor 313 could receive information about the operating system version, memory, processing or encryption capabilities of the added processor and use such information to select an specific type of communication (for example, select the specific version of a secure transport protocol that is supported by both processors). The applications processor could also unlock or provide other interfaces associated with the added functionality such as by those associated with facilitating a new means of providing payment information to the POS device into a payment flow conducted by the POS device.

In specific embodiments of the invention, a segment of the memory of the security processors may be used to store capabilities information for acquisition by an applications processor or alternative security processor. For example, the security processors may include a one-time programmable memory storing a bit field with the component capabilities. Relevant flags for evaluating the capabilities may include, for example, if the component supports PIN entry, or any kind of card data capture, such as NFC, ICC and MSR, or if the component is a TLS client or server. This allows multiple types of security processors to use the same firmware image, for example.

The creation of a secure channel for communication between the security processors depends on both secure encryption and secure identity verification. The POS security processors should be able to verify their identities to each other and encrypt their communications in a manner that can be decrypted by their counterpart without exposing the overall payment system to attack. One way in which this can be accomplished is through the use of PSKs. In particular, secure encryption and identify verification can be provided by PSKs that have been securely delivered from a verified source or that have been internally generated at their point of use.

In specific embodiments of the invention, PSKs can be made available to various security meshes in a POS system in various ways. PSKs can be provisioned in the POS device. PSKs could be distributed only to verified devices either locally in a secure key injection room or remotely by a remote key injection (RKI). Pre-shared keys could be generated independently on each security processor using known key generation and key exchange mechanisms, such as elliptic key exchange. Pre-shared keys could be generated independently on each security processor using, for example, a Diffie-Hellman key exchange protocol. Pre-shared keys could also be generated and verified by using certificates. Signed certificates can be verified by security processors located within each security mesh to generate a unique pre-shared key using information from the certificates. Signed certificates can be generated externally, for example they can be signed using a private signing key and subsequently received from a certificate authority and verified internally using a signature checking public key located on each of the security processors. Signed certificates could also be generated internally, using, for example, public verification keys and private signing keys that are pre-stored on the security processors. Information stored in the security processors, such as PSK, certificates, signing and verifications keys, can be stored in a secure memory within the security processor.

In specific embodiments, the secure connection may be established via a type of ACCE protocol, such as TLS. For example, if the POS device included an applications processor as an intermediary, the applications processor may query the security processors for their board capabilities. The connection may only be established if the board capabilities indicate that it would possible. The applications processor could send a command to both security processors to initiate a handshake. The first security processor could send a first message that can contain cipher suite specifications and shared random seed. The second security processor could reply with a second message that can contain cipher suite and shared random seed, and parameters exchange, such as DHE parameters. The Diffie Hellman group and the DH public value can also be specified. The public value can be generated by feeding a random number into the Diffie Hellman algorithm for the chosen Diffie Hellman group. The first security processor may then send a reply, such as DHE reply. For example, for the DH group specified by the second security processor, the DHE reply can contain DH public value for the random number chosen by the first security processor. At this point, the first security processor can compute a master secret. The second security processor could be able to compute the master secret from previous messages. The reply sent by the first security processor may also include an authentication code, that can be based on the PSK and the master secret. The second security processor then can send a message informing it is ready for starting communication.

Figure 4:
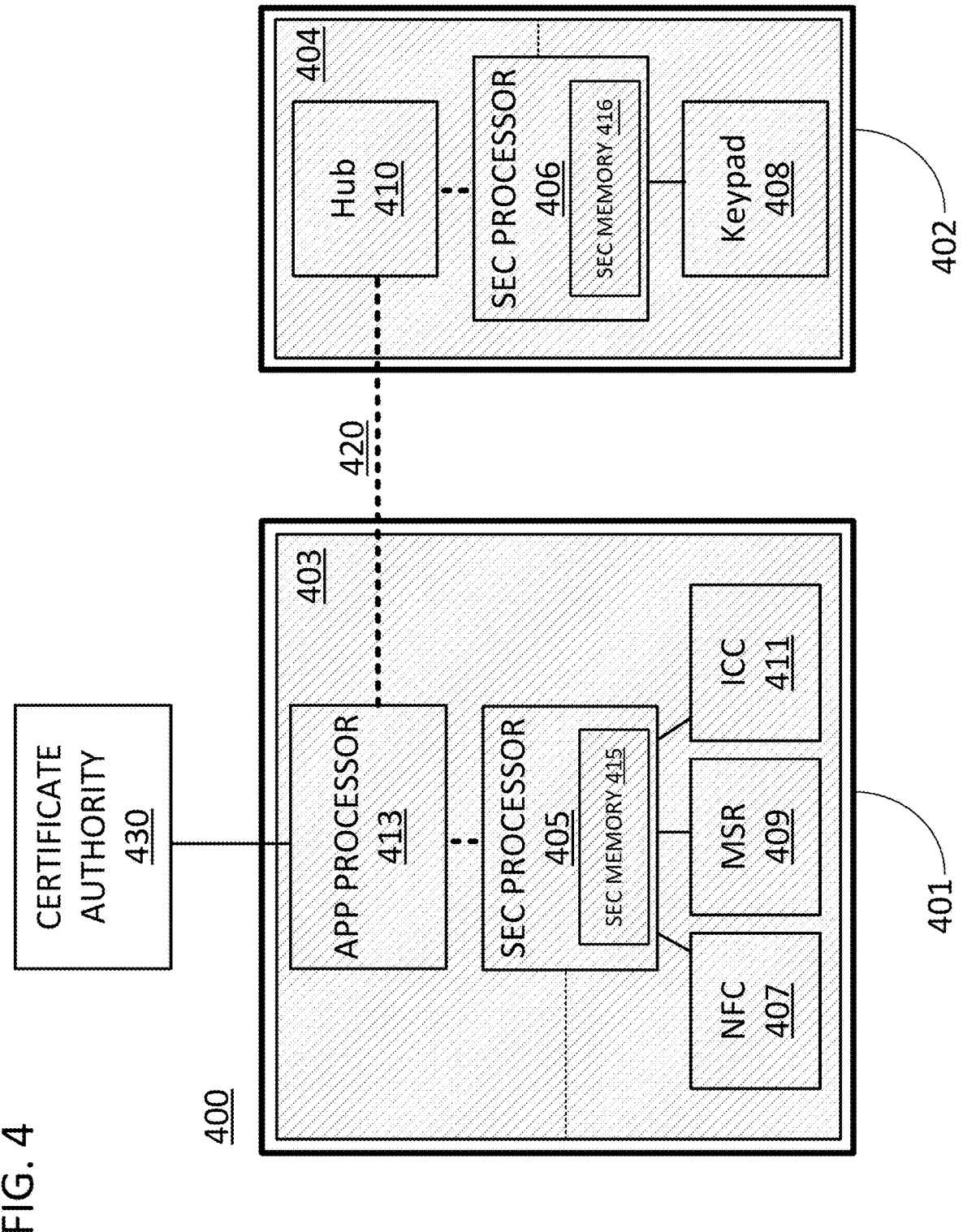
FIG. 4 illustrates the architecture of a POS device with multiple casings including an applications processor communicating with a certificate authority in accordance with specific embodiments of the invention disclosed herein.

A process for establishing a secure connection, exchanging certificates and generating a pre-shared key in accordance with specific embodiments of the present invention will now be described with reference to FIG. 4 and FIG. 5. FIG. 4 illustrates a POS 400 similar to the one described and shown in FIG. 3, which communicates with an external certificate authority 430. In this embodiment, a first casing 401 is provided including a first security mesh 403 and housing an applications processor 413, a first security processor 405, and the front ends 407, 409, 411. A second casing 402 is provided including a second security mesh 404 and housing a USB hub 410, a second security processor 406, and the front end 408. The secure processors 405 and 406 can include secure memories 415 and 416. In this embodiment, applications processor 413 could be responsible for communicating with certificate authority 430. Applications processor 413 could process information received from the security processors 405 and 406 to be sent to the certificate authority 430. Applications processors 413 could have capabilities to adapt the form and/or format of messages to be sent to the certificate authority 430. In the same way, applications processor 413 could have capabilities to adapt the form and/or format of messages received from the certificate authority 430 before they are sent back to the respective security processors 405 and 406. Applications processors 413 may be responsible for returning messages from the certificate authority to each security processor 405 and 406 individually.

Figure 5:
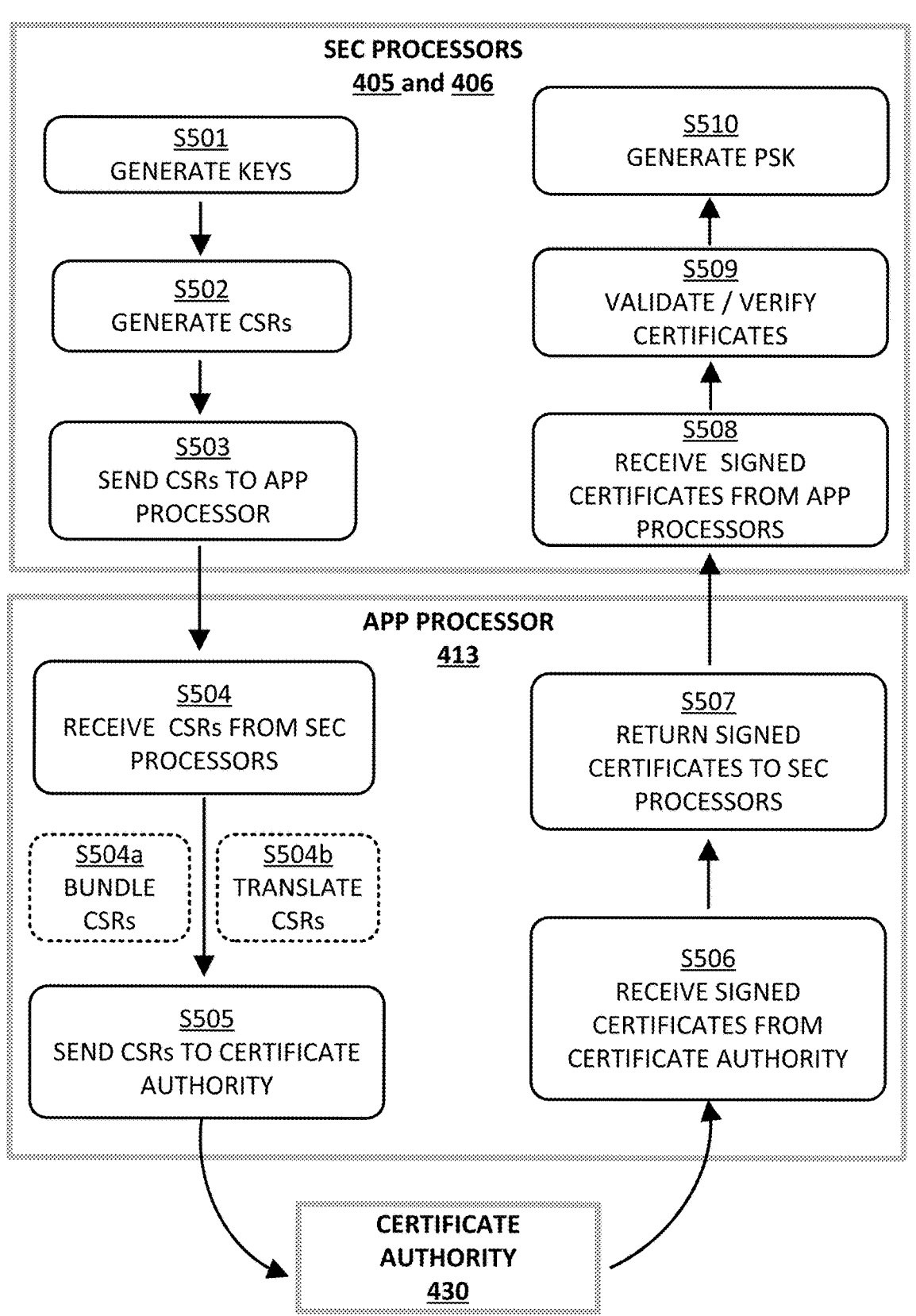
FIG. 5 is a flow chart for a set of methods for establishing a secure connection between casings of a POS device in accordance with specific embodiments of the invention disclosed herein.

FIG. 5 is a flow chart for a set of methods for establishing a secure connection, such as secure connection 420, exchanging certificates and generating a pre-shared key in accordance with specific embodiments of the present invention. The flow chart starts with step S501, where private keys are generated by both security processors 405 and 406. The private keys could be elliptic-curve cryptography (ECC) keys. The keys could be ECC key using the SECP256R1 curve. The certificate signing request (CSR) signature could use the ECDSA algorithm with SHA256 with serial as common name and two extensions only (key usage and basic constraints) for CSR. The keys generated by each security processor can be used to generate CSRs by both security processors 405 and 406 in step S502. Key and CSR generation steps are performed by both security processor 405 and security processor 406 individually. In specific embodiments, these steps will be carried out simultaneously by both security processors 405 and 406. In specific embodiments, these steps will be carried out at different times in each security processor, in no preferred order.

Once the CSRs are generated by security processor 405 and security processor 406, they can be sent to a certificate authority for signature. In the embodiment shown in FIG. 4, applications processor 413 is an intermediary and will be responsible for the communication with certificate authority 430. Thus, the CSR generated by security processor 405 and the CSR generated by security processor 406 can be sent to the applications processor 413 for further processing, as shown in step S503. Security processors 405 and 406 may have limited functionalities and applications processor 413 may provide resources to manage communication with the certificate authority 430 in a simplified and more efficient manner. In step S504, the applications processor receives the CSRs from security processors 405 and 406 and may directly transmit the CSR to the certificate authority 430, in step S505.

In specific embodiments, applications processor 413 may further process the CSRs before sending them to the certificate authority, by translating the CSR to a different format, as shown in optional step S504*b*. For example, an RPC certificate signing request could be translated into a HTTP certificate signing request, such as a JavaScript Object Notation (JSON) HTTP certificate signing request for transmission and further processing in the certificate authority 430. The HTTP certificate signing request could be a combined HTTP certificate signing request containing both of the certificate signing requests from the two security processors. The external certificate authority could be located on a laptop and the requests could be sent over ethernet.

CSRs can include a global unique identifier associated with the security mesh that correspond to the security processors that generated the request. For example, a CSR generated by security processor 406 may include a global unique identifier associated with security mesh 404 and a CSR generated by security processor 405 may include a global unique identifier associated with security mesh 403.

In specific embodiments, different CSRs from different security processors can be bundled by the applications processors 413 into a single or combined request, as shown in optional step S504*a*. For example, applications processor 413 may receive the CSR generated individually by security processor 405 and the CSR generated individually by security processor 406 in step S504 and combine them into a single request before they are sent to the certificate authority 430 in step S505. This process increases the efficiency of the system because it reduces the number of messages exchanged between the POS 400 and the external certificate authority 430.

In specific embodiments, additional measures are taken to assure the validity and integrity of the certificates. In specific embodiments, certificates could have a short validity period, for example, the validity period may be of around 15 minutes. In specific embodiments, if the validity period expires before the process is completed, the certificates will not be validated by the POS device. In specific embodiments, generated private keys could be stored in volatile memory such as RAM. The certificate and keys could be discarded immediately if the process fails.

The certificate authority 430 processes and signs the CSR received from the applications processor 413. CSR processed by the certificate authority may be from each security processor 405 and 406 individually, or a single request previously bundled by the applications processor 413. The certificate authority 430 sends the certificate chain back for the security processors 405 and 406. In the embodiment shown in FIG. 4, the certificate authority 430 sends the certificate chain back to the applications processor 413, that will then be responsible for processing and returning them to the corresponding security processors 405 and 406.

The flow diagram of FIG. 5 shows step S506 wherein applications processor 413 receive the signed certificates from the certificate authority 430, and step S507 wherein the applications processor 413 returns the certificates to security processors 405 and 406.

The certificate authority 430 could return different certificates to be used for further processing. For example, the certificate authority 430 could return a root certificate, a policy certificate, a provisioning certificate, and certificates for each security processors 405 and 406, such as ECC certificates. The certificates for security processors 405 and 406 could be returned simultaneously or in no particular order.

Once the security processors 405 and 406 are in receipt of the certificates chain in step S508, they will individually validate and/or verify the certificates in step S509. This process could include numerous steps from the following. In order to validate the certificates, security processors 405 and 406 could verify, for example, the validity period of the certificates, inclusive of current time. Security processors 405 and 406 could also verify the type of curve used, for example, if the curve is SECP256R1. Security processors 405 and 406 could also verify if the public key in one of the certificates, corresponds to the local private key. Security processors 405 and 406 could also verify if the public key in the other certificate is a valid point on the curve and not the point at infinity. Security processors 405 and 406 could also validate if both ECPSK certificates have different public keys. Security processors 405 and 406 could also validate both certificates chains up to the trusted root certificate authority.

After each security processor 405 and 406 has validated the certificates chain, each security processor 405 and 406 derives the PSK in step S510. The PSK could be derived using key agreement protocols and functions know to those skilled in the art, such as Elliptic-curve Diffie-Hellman (ECDH), Elliptic Curve Diffie-Hellman Ephemeral (ECDHE), and a hash-based key derivation function (HKDF). The derivation can result from the execution of a protocol such as ECDHE (i.e., ECDHE (private key 1, public key 2)=ECDHE (private key 2, public key 1)). The processing can be carried out in each security processor 405 and 406, using the local private key and a public key.

As a result of the process described above, each security processor 405 and 406 can derive the same PSK and securely communicate with each other. The steps of certificate validation and derivation of PSK could be performed by each security processor individually, simultaneously or in no particular order.

Each security processor 405 and 406 can derive the PSK from the ECDHE output via an HKDF algorithm. The HKDF algorithm uses context information to ensure the PSK is dependent on the particular pair of secure certificates. The use of context information to enforce the dependency is known as cryptographic binding. Cryptographic binding provides an additional layer of protection against inappropriate reuse of keys, such as ECC keys. If the process fails, ECPSK certificates and keys may be deleted and the process can be restarted. The PSK could be stored in a security processors encrypted storage or secure memory. The context information can be derived by lexicographically ordering the certificates by subject and concatenating the following strings to form the context information with null terminators removed: "title of customized PSK"; "distinguishing name for certificate 1" (e.g., global identifier of CSR generator for that certificate); "distinguishing name for certificate 2" (e.g., global identifier of CSR generator for that certificate); serial number of the first certificate; serial number of the second certificate. The pre-shared key could then be calculated according to PSK=HKDF_SHA256 (ECDHE, context_info). With context_info being the aforementioned string. The HKDF could also use a random salt parameter. The process could be finalized by storing the PSK in encrypted format within the secure memory of the security processor. Alternatively, if any of the steps in the process fail, all ECPSK certificates as well as the keys could be deleted in favor of restarting the entire process.

Authentication could also be carried out by using mutual authentication via certificates with no need of a certificate authority. In a scenario where a certificate authority is not present, such as the one shown in FIG. 3, the certificates, private signing key and public verification key could be stored in the secure memories 315 and 316 in the security processors 305 and 306. In this embodiment, external connection with a certificate authority would not be required in order to sign and verify the certificates. When a certificate request is sent from the first security mesh boundary 303 to the second security mesh boundary 304, the certificate can be signed using a private signing key pre-stored in the second security processor 306. This certificate is sent back to the first security mesh boundary 303 and can be verified using a public verification key pre-stored in the first security processor 305. This embodiment provides an alternative for authentication when no Internet connection is available. The public verification key and private signing key could be pre-stored in a secure memory of the secure processors by the manufacturer or injected in a secure facility.

Figure 6:
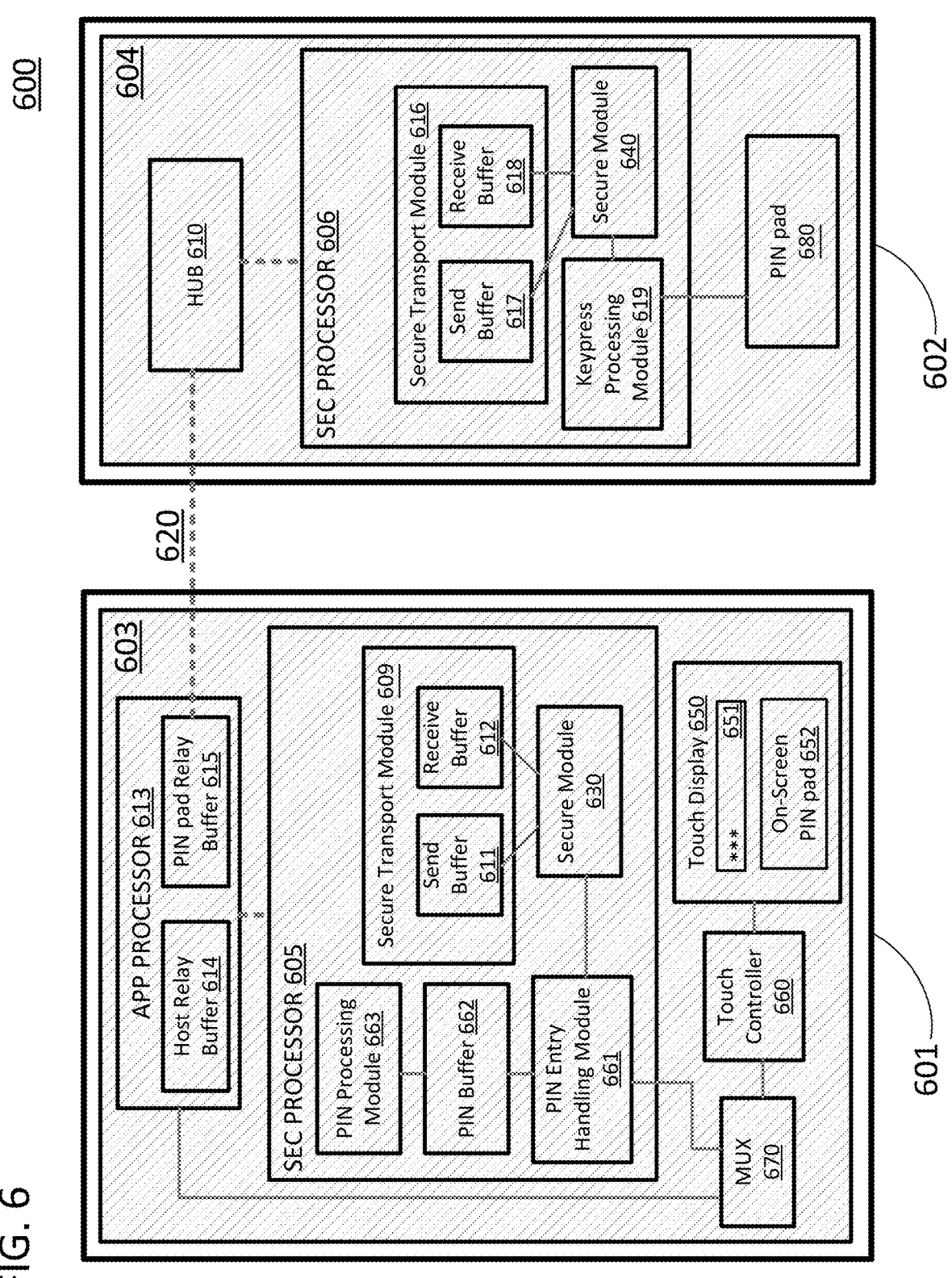
FIG. 6 illustrates an example of the architecture of a POS device comprising a host casing and a PIN pad casing that securely exchange information in accordance with specific embodiments of the invention disclosed herein.

With reference now to FIG. 6, the process of exchanging information through a secure connection in a POS device 600 in accordance with specific embodiments of the present invention can be explained. FIG. 6 illustrates a main casing 601 (host) comprising an applications processor 613, a security processor 605, a display 650, a controller 660 and a multiplexer 670. The display 650 can be a touch display, and the controller 660 can be a touch controller. The touch display 650 could send touch coordinates to the applications processor 613 in an unsecure mode and send touch coordinates to the security processor 605 in a secure mode. For example, when payment information is being entered in the touch display 650, the touch controller 660 and multiplexer 670 could operate in a secure mode and forward the information to the security processor 605. However, when the information being entered is not sensitive, such as information about a number of items to be purchased, the controller 660 and multiplexer 670 could operate in an unsecure mode and forward the information directly to the applications processor 613.

In the embodiment shown in FIG. 6, the host casing 601 is connected to a second casing 602 (PIN pad), which comprises a PIN pad 680, a security processor 606 and a USB hub 610. The host casing 601 supports the first security mesh 603, associated with security processor 605 and the PIN pad casing supports a second security mesh 604, associated with security processor 606. The applications processor 613 includes a host relay buffer 614 and a PIN pad relay buffer 615. The applications processor 613 can manage the secure connection 620 and exchange of information between the host security processor 605 and the PIN pad security processor 606.

The secure connection 620 could be established over a USB connection. The PIN pad 602 includes a USB hub 610 that allows a USB connection and a transport abstraction layer can be provided on the applications processor 613 for the security processors 605 and 606 to communicate. A USB RPC protocol could be used for exchanging information.

RPCs can be instantiated by the applications processor 613. Security processors 605 and 606 can respond when the RPC is complete. RPC messages could contain different elements, such as an RPC ID indicating a desired functionality, a data length field, and a data field, formatted as defined by the RPC ID.

In the embodiment illustrated in FIG. 6, the applications processor 613 could constantly check if there is content in either the host relay buffer 614 or the PIN pad relay buffer 615. If there is content, an RPC with the content is generated for each relay buffer 614 and 615 and sent to the corresponding security processor 605 or 606. The RPC could be sent via USB RPC. Each security processor 605 and 606 could receive an RPC. The content of the RPC is copied to the corresponding secure transport module receive buffer 612 or 618. Via a callback, the secure transport modules 609 and 616 alert the corresponding secure module 630 or 640 of the existence of new data. The secure modules 630 and 640 can then decrypt the data. The secure modules 630 and 640 located in the security processors 605 and 606 decrypt/authenticate the data. Data can be provided to a payment logic, for example to the pin entry handling module 661. Each security processor 605 and 606 prepares a response to the RPC. The response could contain content from the secure transport module send buffers 611 and 617. The content in the send buffers 611 and 617 can be provided via a payment logic, for example captured PIN digits, and then encrypted by the respective secure module 630 or 640. The applications processor 613 can receive the responses. The content can be written to the corresponding relay buffer 614 or 615. The secure modules could be TLS modules. The Secure Transport Modules could be TLS transport modules and the relay buffers could be TLS relay buffers.

This process occurs in a loop so that the applications processor 613 is constantly checking for new content. The applications processor 613 periodically polls the security processors 605 and 606 for outbound messages for the other security processors and transfers, using the secure connection 620, the outbound messages to the respective security processor.

Still with reference to FIG. 6, a specific example of a process of entering a PIN will be described. The device 600 could operate with two PIN pads: a virtual on-screen PIN pad 652 and a physical PIN pad 680. The POS device 600 can be configured to either accept PIN entry on each PIN pad individually or on both PIN pads acting in conjunction. In addition to buttons for the 10 standard digits, both the physical and virtual PIN pads include buttons for additional commands such as "backspace" and "enter". The described PIN entry process assumes that the secure connection has already been established.

The PIN entry process starts when the device 600 displays a PIN entry prompt in the display 650. The PIN entry prompt could include an on-screen PIN pad 652 or an indication to use the physical PIN pad 680 to enter the PIN. The user of device 600 can press a button to enter a PIN digit or otherwise effectuate a command. If the virtual on-screen PIN pad 652 is used, the touch controller 660 sends the information representing the button pressed to the host security processor PIN entry handling module 661. If the physical PIN pad 680 is used, the information representing the button pressed is first sent to the keypress processing module 619 in the PIN pad security processor 606. The keypress processing module 619 could generate a data packet representing the button pressed. The keypress data packet is sent to the secure module 640 and can be used as the payload for a packet, such as a TLS record layer packet. The packet can be both encrypted and MACed. The packet can be securely sent to the host security processor 605 using the secure connection 620. The secure module 630 of the host security processor 605 can decrypt the payload and verify the MAC. The payload, that represents the button pressed in the example describe herein, is then passed to the PIN entry handling module 661.

The PIN entry handling module 661 in the host security processor 605 processes the information representing the button pressed, regardless of the source. If the button is a digit, the digit is added to PIN buffer 662. If the button is "backspace", the last digit is deleted from the PIN buffer 662. If the button is "enter" the content in PIN buffer 662 is sent to the PIN processing module 663 for further processing. The number of digits in the PIN buffer 662 can be displayed via filler symbols (asterisk or similar) in a PIN status indicator 651 in display 650.

The packet, such as the TLS record layer packet, may depend on a sequence number, such as a TLS sequence number. Both the host security processor 605 and the PIN pad security processor 606 may need to keep track of the number of records they have sent or received. If the records do not match, the host security processor 605 may reset.

While the specification has been described in detail with respect to specific embodiments of the invention, it will be appreciated that those skilled in the art, upon attaining an understanding of the foregoing, may readily conceive of alterations to, variations of, and equivalents to these embodiments. The processors mentioned herein can individually include computer readable media accessible to those processors. The computer readable media can store instructions that are executable by the processors to cause the devices to execute the methods disclosed herein. Although examples in the disclosure were generally directed to POS devices, similar approaches can be applied to any device with multiple security meshes which need to securely share information amongst the various meshes. Although examples in the disclosure were generally directed to one or more casings conforming a POS device, it can be understood that the one or more casings could also be one or more individual POS devices forming a POS system. Furthermore, although examples provided herein where mainly directed to multiple security meshes, similar approaches can be used to provide secure connection between any isolated secure hardware environments. These and other modifications and variations to the present invention may be practiced by those skilled in the art, without departing from the scope of the present invention, which is more particularly set forth in the appended claims.

What is claimed is:

1. A point of sale device comprising:
a first casing housing an applications processor, a first security processor located within a first security mesh, and a first front end for receiving first information associated with a transaction;

a second casing housing a second security processor located within a second security mesh and a second front end for receiving second information associated with the transaction, wherein a secure connection is established between the first security processor and the second security processor; and
a computer readable medium housed within the first casing and accessible to the applications processor and storing instructions which, when executed by the applications processor cause the applications processor to:
in response to detecting the second security processor:
receive capabilities information from the second security processor including a secure protocol compatible with the second security processor;
adjust at least one aspect of an operating system of the applications processor based on the capabilities information;
receive a first remote procedure call (RPC) certificate signing request from the first security processor and a second RPC certificate signing request from the second security processor;
translate the first RPC certificate signing request into a first hypertext transfer protocol (HTTP) certificate signing request and the second RPC certificate signing request into a second HTTP certificate signing request;
transmit the first HTTP certificate signing request and the second HTTP certificate signing request to a certificate authority;
receive a signed first certificate from the certificate authority in response to the first certificate signing request and a signed second certificate from the certificate authority in response to the second certificate signing request; and
transmit the signed first certificate to the first security processor and the signed second certificate to the second security processor to cause the first security processor and the second security processor to each verify the signed first certificate and the signed second certificate to establish a secure connection between the first security processor and the second security processor.

2. The point of sale device of claim 1, wherein the first security processor and the second security processor each generate a unique pre-shared key using a key generation algorithm and information from the signed first certificate and the signed second certificate.

3. The point of sale device of claim 1, wherein the instructions cause the applications processor to receive the first information associated with the transaction and the second information associated with the transaction.

4. The point of sale device of claim 2, wherein the instructions cause the applications processor to transfer, using the secure connection, messages between the first secure processor and the second secure processor.

5. The point of sale device of claim 4, wherein the instructions cause the applications processor to periodically poll the second security processor for messages to the first security processor.

6. The point of sale device of claim 4, wherein the first security processor decrypts a message of the messages originating at the second security processor.

7. The point of sale device of claim 6, wherein the applications processor is unable to decrypt the message.

8. The point of sale device of claim 7, wherein the message includes the second information associated with the transaction received at the second front end.

9. The point of sale device of claim 6, wherein the first casing is capable of functioning as a separable point of sale device.

10. The point of sale device of claim 1, wherein the second casing includes a USB hub to facilitate a wired connection between the first security processor and the second security processor.

11. A non-transitory, computer-readable medium housed within a first casing of a point of sale device and accessible to an applications processor of the point of sale device, the medium including storing instructions which, when executed by the applications processor cause the applications processor to:

in response to detecting a second security processor housed within a second casing of the point of sale device:

receive capabilities information from the second security processor including a secure protocol compatible with the second security processor;

adjust at least one aspect of an operating system of the applications processor based on the capabilities information;

receive a first remote procedure call (RPC) certificate signing request from the first security processor and a second RPC certificate signing request from the second security processor;

translate the first RPC certificate signing request into a first hypertext transfer protocol (HTTP) certificate signing request and the second RPC certificate signing request into a second HTTP certificate signing request;

transmit the first HTTP certificate signing request and the second HTTP certificate signing request to a certificate authority;

receive a signed first certificate from the certificate authority in response to the first certificate signing request and a signed second certificate from the certificate authority in response to the second certificate signing request;

transmit the signed first certificate to the first security processor and the signed second certificate to the second security processor to cause the first security processor and the second security processor to each verify the signed first certificate and the signed second certificate to establish a secure connection between the first security processor and the second security processor;

receive first information associated with a transaction from the first security processor; and receive second information associated with the transaction from the second security processor.

12. The non-transitory, computer-readable medium of claim 11, wherein the first security processor and the second security processor each generate a unique pre-shared key using a key generation algorithm and information from the signed first certificate and the signed second certificate.

13. The non-transitory, computer-readable medium of claim 11, wherein the first casing houses a first front end for receiving the first information associated with the transaction, and wherein the second casing houses a second front end for receiving the second information associated with the transaction.

14. The non-transitory, computer-readable medium of claim 12, wherein the instructions cause the applications processor to transfer, using the secure connection, messages between the first secure processor and the second secure processor.

15. The non-transitory, computer-readable medium of claim 14, wherein the instructions cause the applications processor to periodically poll the second security processor for messages to the first security processor.

16. The non-transitory, computer-readable medium of claim 14, wherein the first security processor decrypts a message of the messages originating at the second security processor.

17. The non-transitory, computer-readable medium of claim 16, wherein the applications processor is unable to decrypt the message.

18. The non-transitory, computer-readable medium of claim 17, wherein the message includes the second information associated with the transaction.

19. The non-transitory, computer-readable medium of claim 16, wherein the first casing is capable of functioning as a separable point of sale device.

20. The non-transitory, computer-readable medium of claim 11, wherein the second casing includes a USB hub to facilitate a wired connection between the first security processor and the second security processor.

* * * * *